United States Patent [19]
Oscarsson et al.

[11] Patent Number: 5,993,970
[45] Date of Patent: Nov. 30, 1999

[54] SINTERING TRAY

[75] Inventors: Ulf Oscarsson, Tumba; Per Gustafson, Huddinge; Chris Chatfield, Gimo; Mikael Lagerquist, Upplands Väsby, all of Sweden

[73] Assignee: Sandvik AB, Sandviken, Sweden

[21] Appl. No.: 08/837,094

[22] Filed: Apr. 14, 1997

[51] Int. Cl.[6] .................................................. B32B 9/00
[52] U.S. Cl. ........................ 428/408; 428/212; 428/216; 428/220; 428/457; 428/472; 428/688; 428/689; 428/698; 428/701; 428/702; 427/34; 427/255.2; 427/255.3; 427/309; 264/62; 264/65; 264/66
[58] Field of Search ................................. 428/688, 689, 428/698, 701, 702, 212, 216, 220, 408, 457, 472; 427/255.2, 255.3, 452, 453, 309, 34, 387; 264/62, 67, 65, 66; 501/92

[56] References Cited

U.S. PATENT DOCUMENTS

| | | | |
|---|---|---|---|
| 4,357,382 | 11/1982 | Lambert et al. | 428/212 |
| 4,701,384 | 10/1987 | Sarin et al. | 428/688 |
| 4,840,854 | 6/1989 | Kojima et al. | 428/698 |
| 4,906,431 | 3/1990 | Brundbjerg et al. | 428/698 |
| 5,418,015 | 5/1995 | Jackson et al. | 427/452 |

OTHER PUBLICATIONS

H. Kolaska et al., "Powder Metallurgy of Hardmetals", EPMA Lecture Series, Lecture 6, Sintering—Technical and Basic Principles, European Powder Metallurgy Association, Shrewsbury, UK, 1995, pp. 6/9–6/10.

Patent Abstract of Japan, abstract of JP 07-089769, Dialog Information Services Inc., File 351, Dialog Accession Number 010265860, Derwent Accession Number 95–167115/22, IBIDEN Co Ltd: "Tray for Sintering Cemented Carbide Chip", JP,A, 7089769, 950404, 9522 (Basic) Apr. 1995.

Primary Examiner—Deborah Jones
Assistant Examiner—Abraham Bahta
Attorney, Agent, or Firm—Burns, Doane, Swecker & Mathis, L.L.P.

[57] ABSTRACT

The present invention discloses a method of sintering of cemented carbide or cermet bodies lying on graphite trays. By using graphite trays coated with a covering layer of $Y_2O_3$ containing $\leq 20$ wt-% $ZrO_2$, or corresponding volumetric amount of other refractory oxides, e.g., $Al_2O_3$ or combinations thereof, with an average thickness of $\geq 10\,\mu m$, the life of the trays between regrindings and recoatings can be largely extended.

20 Claims, 1 Drawing Sheet

SINTERING TRAY

BACKGROUND OF THE INVENTION

The present invention relates to a tray to be used when sintering powder metallurgical articles such as products of cemented carbides and cermets.

Cemented carbides and cermets are alloys mainly containing hard constituents based on carbides, nitrides and/or carbonitrides of Ti, Zr, Hf, V, Nb, Ta, Cr, Mo and/or W in a binder essentially based on Co and/or Ni and/or Fe. They are normally produced by powder metallurgical methods comprising milling a powder mixture containing powders forming the hard constituents and binder phase, pressing and sintering.

After pressing, the compacted bodies contain about 50% by volume of open porosity. Fully dense products are then produced by liquid phase sintering at a temperature when the binder metal is in liquid state, which in practice is normally in the 1300–1550° C. range depending on composition.

In the production of cemented carbides and cermets, almost all sintering processes are performed in an industrial vacuum, i.e., from about 1 torr upwards and in the presence of various gas atmospheres, such as mixtures of $H_2$ plus CO, $CO_2$, Ar, $N_2$, $CH_4$ etc., and with the bodies to be sintered lying on graphite trays. In order to minimize the influence of the graphite, both in the contact with the bodies to be sintered and with the atmosphere within the furnace, these trays are normally surface coated, see e.g., H. Kolaska et al., "Powder Metallurgy of Hardmetals", EPMA Lecture Series, Lecture 6, Sintering—Technical and Basic Principles, European Powder Metallurgy Association, Shrewsbury, UK, 1995, p.6/9–6/10. In practice, an $Al_2O_3$ or $ZrO_2$ based coating is used, applied by thermal spraying, preferably plasma powder spraying. Thus, these coatings act as barrier layers preventing reaction from occurring between the sintered body and the tray. Reaction can lead to many problems, i.e., carbon uptake from the trays and distortion of the sintered bodies.

It is essential that these graphite trays with barrier layers be reused for as many sintering cycles as possible without deterioration of the layers occurring, i.e., to maintain inertness and high adhesion to the graphite tray. Normally, the necessity to regrind and recoat the trays is determined by the skilled operator when the coating has been torn off to such an extent that it is easily seen by the naked eye of the operator.

The deterioration is due to metallurgical reactions taking place between the cemented carbide body and the tray leading to unloading problems caused by sticking. When removing such bodies adhering to the tray, cracks may be formed in the coating of the tray. Individual grains from the very surface of the coating or pieces of the coating may be torn off. The problem is especially severe when sintering large bodies of cemented carbides having comparatively large contents of binder phase, these conditions promoting adhesion.

OBJECTS AND SUMMARY OF THE INVENTION

It is an object of this invention to avoid or alleviate the problems of the prior art.

It is further an object of this invention to provide a tray to be used when sintering powder metallurgical articles such as products of cemented carbides and cermets.

In one aspect of the invention there is provided in a method of sintering of cemented carbide or cermet bodies lying on graphite trays, the improvement comprising using graphite trays having a coating of a covering layer of $Y_2O_3$ containing $\leq 20$ wt-% $ZrO_2$ with an average thickness of $\geq 10$ μm.

In another aspect of the invention there is provided a tray for sintering of cemented carbide or cermet bodies comprising graphite and a coating of a covering layer of $Y_2O_3$ containing $\leq 20$ wt-% $ZrO_2$ with an average thickness of $\geq 10$ μm.

In yet another aspect of the invention there is provided a tray for sintering of cemented carbide or cermet bodies comprising graphite having an intermediate layer 20–300 μm thick of Mo, W or combinations thereof and an outer layer 20–300 μm thick of $Y_2O_3$ containing another refractory oxide in an amount calculated as $\leq 20$ wt-% $ZrO_2$.

BRIEF DESCRIPTION OF THE DRAWINGS

The FIGURE shows in 3× magnification the contact surfaces of two cutting tool inserts with identical background after normal production sintering at 1410° C. and sintered in the same sintering batch but on different trays.

DETAILED DESCRIPTION OF THE PREFERRED EMBODIMENTS OF THE INVENTION

Figure 1:
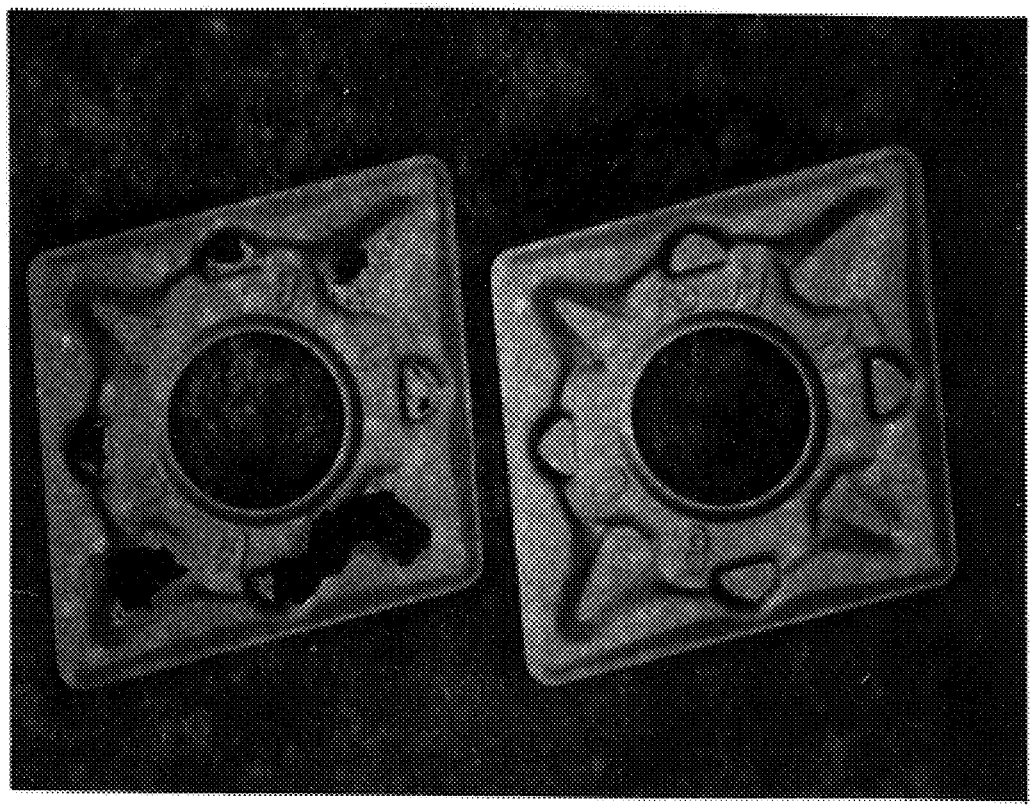

It has now surprisingly been found that using a barrier layer based on yttria ($Y_2O_3$), the life of the coated trays used for production sintering exhibits a significant increase, compared to prior art coated trays, before they have to be reground and recoated. This results in large production cost savings and an improved quality of the sintered products.

According to the method of the present invention, cemented carbide or cermet bodies are sintered on graphite trays coated with a covering layer of $Y_2O_3$ or based on $Y_2O_3$, containing $\leq 20$ wt-% $ZrO_2$, preferably $\leq 10$ wt-% $ZrO_2$, and most preferably $\leq 5$ wt-% $ZrO_2$. If desired, other refractory oxides, e.g., $Al_2O_3$ or combinations thereof, can be used in place of the $ZrO_2$ in volumetric amounts which correspond to the amount by weight of $ZrO_2$. Preferably, one or more intermediate layers of a refractory metal such as Mo, W, Nb, Zr, Ta, preferably Mo or W or combinations thereof, and/or of a refractory oxide, preferably $ZrO_2$-based, is applied. The average thickness of each of these layers should each be $\geq 10$ μm, preferably 20–300 μm, most preferably 50–150 μm.

The most important property when choosing a material for the intermediate layer or layers is a strong adhesion both to the underlying graphite surface and to the top coating of yttria or yttria-based compound. However, it is also important that these interlayer materials are thermally stable within the temperature range from room temperature up to working temperature, which normally is up to about 1550° C. Further, they should not react with the adjacent materials in such a way that the functions of the latter are affected negatively.

The coating is applied by known powder-spraying methods, preferably plasma spraying, using a powder having a grain or agglomerate size where the main distribution is within the range 10–100 μm, preferably 10–75 μm. In order to facilitate the spraying process regarding powder flow from the container and through the gun, the powder is preferably agglomerated.

In an alternative embodiment, the coating is formed by applying a slurry containing the powder considered and then dried and sintered. Chemical Vapor Deposition techniques can also be used.

The invention is additionally illustrated in connection with the following Examples which are to be considered as illustrative of the present invention. It should be understood, however, that the invention is not limited to the specific details of the Examples.

EXAMPLE 1

Cutting tool inserts were pressed from four different cemented carbide powder mixtures. Two of them were WC and 10 wt-% Co with high and low carbon content, denoted material A-hc and A-lc, respectively, and in the remaining two, an addition of 5 wt-% TiC was made by exchanging for the corresponding amount of WC. These, also being separated by a high and low carbon content, are denoted material B-hc and B-lc, respectively. The pressed inserts were placed on different trays, namely:

Tray 1: Uncoated graphite tray. (Prior art)

Tray 2: Graphite tray with a plasma-sprayed coating of $ZrO_2$ and 20% $Y_2O_3$ (Metco 202), with a coating thickness of about 60–100 μm. (Prior art)

Tray 3: Graphite tray with a plasma-sprayed top coating of $Y_2O_3$, about 10–15 μm thick, and an intermediate layer of Mo, about 20–50 μm thick and also applied by plasma-spraying. (Invention)

Note that the coating thicknesses were measured on a metallographic section through the tray.

A long-time sintering process was made at 1450° C. for 50 hours in an atmosphere of 10 mbar CO. After cooling down, the sintered bodies were tested to see how strongly they adhered to the support by a metallurgical reaction. The results obtained are shown in the Table in which "n-r" stands for no reaction with the tray, "c-r" for a certain reaction but no noticeable adherence and "s" for sticking with a very high adherence.

TABLE

Results of sintering test on various trays

| Tray | Materials | | | |
|---|---|---|---|---|
|  | A-hc | A-lc | B-hc | B-lc |
| 1 (prior art) | s | s | s | s |
| 2 (prior art) | s | s | s | s |
| 3 (invention) | n-r | n-r | c-r | c-r |

Thus, the graphite trays with a metallic coating of Mo followed by a top coating of $Y_2O_3$ give a far better performance than the other two trays tested.

EXAMPLE 2

Cutting tool inserts were pressed from a cemented carbide powder mixture consisting of WC-6.5 wt-% Co-8.5 wt-% (TiC +NbC +TaC). Sintering was performed at 1450° C. and the cooling rate was chosen to obtain a binder phase enrichment in the surface region of the inserts as known in the art. This treatment also results in the formation of a cobalt layer on the insert surface. These inserts, about 100 pieces on each tray, were sintered on the following trays, namely:

Tray 1: Graphite tray with a plasma-sprayed coating of $ZrO_2$ and 20% $Y_2O_3$, with a coating thickness of about 60–100 μm. (Prior art)

Tray 2: Graphite tray with a plasma-sprayed coating of $Y_2O_3$, about 100–150 μm thick, and an intermediate layer of plasma-sprayed Mo, about 100–150 μm thick. (Invention)

Note that the coating thicknesses were measured using a micrometer screw gauge.

After a sintering according to standard practice, hold time at temperature about 60 minutes, the inserts sintered on Tray 1 exhibited excessive reaction between the tray material and the inserts such that about 10% of the inserts were difficult to remove from the trays without pieces of the tray material strongly adhering to them. In contrast, the inserts sintered on Tray 2 showed no tendency to react with the tray material. The inserts were easily removed.

The FIGURE shows in 3x magnification, the contact surfaces of two cutting tool inserts from this Example where the insert to the left was sintered on Tray 1 and the one to the right on Tray 2. The former insert shows severe sticking of tray material while the insert to the right is essentially unaffected.

Microprobe analysis showed the presence of yttrium in the contact surfaces of the inserts sintered on Tray 2.

EXAMPLE 3

Cutting tool inserts, pressed from a cemented carbide powder mixture consisting of WC-9.5 wt-% Co-35 wt-% (TiC+NbC+TaC), were sintered in normal production at 1520° C. on the following type of trays, namely:

Tray 1: Graphite tray with a plasma-sprayed coating of $ZrO_2$ and 20% $Y_2O_3$, with a coating thickness of about 60–100 μm. (Prior art)

Tray 2: Graphite tray with a plasma-sprayed coating of $Y_2O_3$, about 100–150 μm thick, and an intermediate layer of plasma-sprayed Mo, about 100–150 μm thick. (Invention)

At this sintering temperature and with the cemented carbide composition given, the life of Tray 1 was two to three sinterings, after which the tray was rejected due to large amounts of its coating being removed, while Tray 2 gave a life in excess of twenty sinterings.

EXAMPLE 4

Cutting tool inserts were pressed from a cemented carbide mixture consisting of WC-10 wt-% Co-6 wt-% (TiC+NbC+ TaC) and having a low carbon content. The pressed inserts were placed on two different trays, 100 inserts on each, and sintered for 1 hr at 1410° C.

Tray 1: Graphite tray with a plasma-sprayed coating of $ZrO_2$ and 20% $Y_2O_3$ (Metco 202), with a coating thickness of about 60–100 μm. (Prior art)

Tray 2: Graphite tray coated with $ZrO_2$ and 20% $Y_2O_3$ (Metco 202) as in Tray 1, but having a top, plasma-sprayed coating of $Y_2O_3$, about 10–15 μm thick. (Invention)

The thicknesses of the coatings were evaluated on a metallographic section through the tray after the sintering test.

After sintering, the inserts on Tray 1 suffered from heavy sticking and could only be removed by force. About 60% of the inserts removed exhibited pieces of the tray coating adhering to the bottom surfaces and these adhesions could only be removed by using a grinding wheel. Tray 1 showed the corresponding damage within its surface coating.

The inserts on Tray 2, however, could easily be removed by simply turning the tray upside down.

EXAMPLE 5

Cemented carbide bodies for mining tool applications were pressed from cemented carbide powder mixtures consisting of WC 12 wt-% Co. Such bodies can weigh up to 300 g per piece. Production sintering was performed on the following trays, namely:

Tray 1: Graphite tray with a plasma-sprayed coating of $ZrO_2$ and 20% $Y_2O_3$, with a coating thickness of about 60–100 μm. (Prior art)

Tray 2: Graphite tray with a plasma-sprayed coating of $Y_2O_3$, about 100–150 μm thick, and an intermediate layer of plasma-sprayed Mo, about 100–150 μm thick. (Invention)

At a sintering temperature of 1450° C., Tray 1 can be used only twice. The comparatively large amount of cobalt in the cemented carbide bodies and the large unit weight cause excessive reaction between the bodies and the tray material. At this temperature and with the same cemented carbide material and unit weight, Tray 2 can be used for greater than six sinterings.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. In a method of sintering of cemented carbide or cermet bodies lying on graphite trays, the improvement comprising using graphite trays having a covering layer comprising a coating of $Y_2O_3$ containing ≦20 wt-% $ZrO_2$ with an average thickness of 24 10 μm.

2. In the method of claim 1 wherein said coating further comprises one or more intermediate layers containing a refractory metal selected from the group consisting of Mo, W, Nb, Zr, Ta and mixtures thereof, with an average thickness of 24 10 μm.

3. In the method of claim 2 wherein the one or more intermediate layers contain Mo, W or combinations thereof.

4. In the method of claim 1 wherein said coating further comprises one or more intermediate layers containing a refractory oxide with an average thickness of 24 10 μm.

5. In the method of claim 4 wherein the one or more intermediate layers are $ZrO_2$-based.

6. A tray for sintering of cemented carbide or cermet bodies comprising graphite and a covering layer comprising a coating of $Y_2O_3$ containing ≦20 wt-% $ZrO_2$ with an average thickness of ≧10 μm.

7. The tray of claim 6 wherein said coating further comprises one or more intermediate layers containing a refractory metal selected from the group consisting of Mo, W, Nb, Zr, Ta and mixtures thereof, with an average thickness of ≧10 μm.

8. The tray of claim 7 wherein the intermediate coating comprises Mo, W or combinations thereof.

9. The tray of claim 6 wherein said coating further comprises one or more intermediate layers containing a refractory oxide with an average thickness of ≧10 μm.

10. The tray of claim 9 wherein the one or more intermediate layers are $ZrO_2$ based.

11. A tray for sintering of cemented carbide or cermet bodies comprising graphite having an intermediate layer 20–300 μm thick of Mo, W or combinations thereof, and an outer layer 20–300 μm thick containing $Y_2O_3$ and another refractory oxide in an amount calculated as ≦20 wt-%.

12. The tray of claim 11 wherein the intermediate layer is 50–150 μm thick.

13. The tray of claim 12 wherein the outer layer is 50–150 μm thick.

14. The tray of claim 11 wherein the $Y_2O_3$ contains another refractory oxide in an amount calculated as ≦10 wt-%.

15. The tray of claim 14 wherein the other refractory oxide amount is calculated as ≦5 wt-%.

16. A method of sintering cemented carbide or cermet bodies comprising:
   lying said bodies on graphite trays having a covering layer comprising a coating of $Y_2O_3$ and ≦20 wt. % refractory oxide, said coating having a thickness of ≧10μm.

17. A tray for sintering cement carbide or cermet bodies, said tray comprising a graphite body and a protective layer disposed thereon, said protective layer comprising a coating of $Y_2O_3$ and ≦20 wt. % refractory oxide, said coating having a thickness of 24 10 μm.

18. The tray of claim 11, wherein said refractory oxide comprises $ZrO_2$.

19. The tray of claim 14, wherein said refractory oxide comprises $ZrO_2$.

20. The tray of claim 15, wherein said refractory oxide comprises $ZrO_2$.

* * * * *

UNITED STATES PATENT AND TRADEMARK OFFICE
CERTIFICATE OF CORRECTION

PATENT NO. : 5,993,970
DATED : November 30, 1999
INVENTOR(S) : Oscarsson et al.

It is certified that error appears in the above-identified patent and that said Letters Patent is hereby corrected as shown below:

In column 1 of the cover page, after "Filed: April 14, 1997" insert

--Foreign Application Priority Data
April 23, 1996  [SE] Sweden ................9601567-2--

Signed and Sealed this

Twenty-third Day of January, 2001

Attest:

Q. TODD DICKINSON

*Attesting Officer*  *Commissioner of Patents and Trademarks*